(12) United States Patent
Nigon

(10) Patent No.: US 8,494,547 B2
(45) Date of Patent: Jul. 23, 2013

(54) SELF-LEARNING TRANSCEIVER

(75) Inventor: Frederic Nigon, Triel sur Seine (FR)

(73) Assignee: Johnson Controls Technology Company, Holland, MI (US)

( * ) Notice: Subject to any disclaimer, the term of this patent is extended or adjusted under 35 U.S.C. 154(b) by 442 days.

(21) Appl. No.: 11/658,418

(22) PCT Filed: Jul. 27, 2004

(86) PCT No.: PCT/FR2004/002002
§ 371 (c)(1),
(2), (4) Date: Dec. 17, 2008

(87) PCT Pub. No.: WO2006/021627
PCT Pub. Date: Mar. 2, 2006

(65) Prior Publication Data
US 2009/0104918 A1    Apr. 23, 2009

(51) Int. Cl.
*H04W 24/00*    (2009.01)
(52) U.S. Cl.
USPC .................................... 455/456.1; 455/456.6
(58) Field of Classification Search
USPC ... 455/422.1, 432.1–433, 404.2, 456.1–456.6
See application file for complete search history.

(56) References Cited

U.S. PATENT DOCUMENTS

| | | | |
|---|---|---|---|
| 5,396,647 A | | 3/1995 | Thompson et al. |
| 5,445,524 A | * | 8/1995 | Jones ............................ 434/153 |
| 5,635,940 A | * | 6/1997 | Hickman et al. .............. 342/389 |
| 5,857,155 A | | 1/1999 | Hill et al. |
| 5,905,955 A | * | 5/1999 | Bamburak et al. ............ 455/434 |
| 5,978,747 A | * | 11/1999 | Craport et al. ................ 702/150 |
| 6,223,042 B1 | * | 4/2001 | Raffel ............................ 455/455 |
| 6,292,666 B1 | * | 9/2001 | Siddiqui et al. ............. 455/456.4 |
| 7,107,038 B2 | * | 9/2006 | Fitch et al. .................. 455/404.2 |
| 2001/0041568 A1 | * | 11/2001 | Hughes et al. ................ 455/434 |
| 2002/0142783 A1 | | 10/2002 | Yoldi et al. |
| 2003/0064731 A1 | * | 4/2003 | Angelo et al. ................. 455/456 |
| 2004/0248585 A1 | * | 12/2004 | Karacaoglu ................ 455/456.1 |
| 2005/0195777 A1 | * | 9/2005 | Green ........................... 370/338 |
| 2005/0202828 A1 | * | 9/2005 | Pecen et al. .................... 455/453 |
| 2008/0037490 A1 | * | 2/2008 | Hughes et al. ................ 370/338 |
| 2008/0130545 A1 | * | 6/2008 | Green ........................... 370/311 |
| 2008/0133124 A1 | * | 6/2008 | Sarkeshik ..................... 701/201 |
| 2009/0067398 A1 | * | 3/2009 | Green et al. .................. 370/338 |

FOREIGN PATENT DOCUMENTS

| | | |
|---|---|---|
| EP | 0 401 192 B1 | 12/1990 |
| FR | 2856858 A1 | 12/2004 |
| WO | WO 99/66587 | 12/1999 |
| WO | WO 2006/021627 A1 | 3/2006 |

OTHER PUBLICATIONS

International Search Report for PCT/FR2004/002002, date of mailing. Mar. 17, 2005, 3 pages.
Written Opinion for International Patent Application No. PCT/FR2004/002002, mailed Mar. 15, 2005, 6 pages.

* cited by examiner

*Primary Examiner* — Ajit Patel
(74) *Attorney, Agent, or Firm* — Foley & Lardner LLP

(57) ABSTRACT

The invention pertains to a transceiver (10) used in a determined geographical zone (100), comprising a learning module (123) for adapting its operating characteristics, bound by the regulations and/or by the specifications of the said geographical zone A, by other regulations and/or specifications of other geographical zones B, characterized in that it comprises means of identification (125) of the geographical zone B, and means (122) of checking the said characteristics as a function of the said zone.
The user can thus check that he is using a permitted frequency band and adapt his transceiver to suit if necessary.

8 Claims, 2 Drawing Sheets

SELF-LEARNING TRANSCEIVER

CROSS-REFERENCE TO RELATED APPLICATIONS

The present application is a U.S. National Stage Application of International Application No. PCT/FR2004/02002, filed Jun. 27, 2004, which is incorporated herein by reference in its entirety.

BACKGROUND OF THE INVENTION

The invention relates to the field of transceivers subject to telecommunication specifications or regulations determined according to the countries or geographical zones where they are used.

In each country, for example, radioelectric transmissions and/or receptions of telecommunication appliances are limited to frequency bands dependent on their type, and these frequency bands are generally not the same from one country to another.

Such is the case relating to transmissions of domestic electronic appliance remote controls or the like, home automation and automobile electronics.

Likewise the specifications of the protocols of radio data exchanges can vary from one country to another.

Thus, subsequent to moving home or to an automobile trip outside a geographical zone of radioelectric regulation A to a geographical zone of radioelectric regulation B, these appliances for privative use envisaged for regulation A may remain usable in environment B, on condition that the exchange protocols or specifications are compatible, but they are then illicitly so. In the event of incompatibility, the jamming engendered by their use may disturb the radioelectric environment, or indeed turn out to be dangerous. Such is in particular the case for home or garage entrance door remote control devices integrated within the electronic appliances of certain motor vehicles.

Currently, it is the responsibility of the users concerned to change the frequency bands or the protocols of these remote control devices (and of the remotely controlled appliances) and to comply with the regulation in force. But checks are hard to carry out.

Moreover, the European Union envisages the putting in place of remote-toll systems for motorways or other urban zones of use that are compatible in the various European countries. These systems are in particular aimed at rendering the expensive ground infrastructures unnecessary by calling upon satellite-based means of radio links and location. But these significant means are envisaged only for this particular application and will besides be implemented only progressively and over a very long period.

There is therefore currently a requirement to adapt transceivers to suit the local regulations and/or the specifications or protocols of all the countries in which they are apt to be used.

SUMMARY OF THE INVENTION

The invention relates to a transceiver used in a determined geographical zone, comprising a learning module for adapting its operating characteristics, bound by the regulations and/or by the specifications of the said geographical zone, by other regulations and/or specifications of other geographical zones, characterized in that it comprises means of identification of the geographical zone, and means of checking the said characteristics as a function of the said zone.

The user of the transceiver can check that he is using a permitted frequency band and adapt his transceiver to suit if necessary. He can act even if it involves the unsuitability of the latter to the exchange specifications of the geographical zone of use.

Preferably, the identification means comprise means of location of the geographical zone from its place of use and/or means of processing of radio signals for signalling the change of its location when it is transferred from a zone A of regulation and/or specifications, that is determined, to a zone B of regulation and/or specifications that are different.

Advantageously, the radio signalling signals are delivered by zone delimitation posts. These posts can for example be remote-toll posts.

More advantageously, the identification means are designed to provide a code C specifying the said zone to the checking means and the checking means are designed to extract from a memory data characteristic of the regulations and/or of the specifications of the said zone.

The code makes it possible to extract the permitted frequency bands in the memory and to check that the frequency band being used appears among the permitted bands. If this is not the case, the user is warned and can comply with the regulation in force in the zone of use.

According to a beneficial characteristic of the invention, the means of processing are designed to download data characteristic of the location and/or regulations and/or specifications and store them in a memory envisaged for this purpose.

More preferably, the data characteristic of the regulations and/or of the specifications are data of permitted frequency bands and possibly of the communication protocols used in the geographical zones and the checking means control the module for learning the frequency band used by the transmitter.

The user is thus unconcerned with updating of frequencies or protocols.

Advantageously, the means of identification of the geographical zone of use are designed to receive the code on the basis of a keypad.

In the event of failure of the means of processing, the transceiver is not disabled.

Advantageously also, a memory contains data describing the boundaries of the said determined geographical zones and the means of location of the geographical zone of use are designed to collect information delivered by a global positioning system, for example GPS (for Global Positioning System) or a navigation system, to compare them with the data describing the boundaries of the said zones and thus to determine the zone of use.

In both cases, no intervention of the user is necessary during a change of zone, the transceiver automatically adapting its frequency band and its protocol to suit the regulation of zone B.

A characteristic relating to the data describing the boundaries is that they determine rectilinear segments joining successive points of the said boundaries, which points are chosen as a function of the geographical characteristics of the regions on which they are situated.

If for example the transceiver is not usable where mountainous or at sea, the boundaries of the said zones can be arbitrarily determined by any segments whatsoever chosen on the surfaces of these mountains or of these seas, thereby making it possible to simplify the description thereof.

The transceiver of the invention is thus well suited to being integrated with a remote control device carried onboard a motor vehicle.

The invention will be better understood with the aid of the following description of a preferred embodiment of the transceiver according to the invention with reference to the drawing accompanying it, in which:

DETAILED DESCRIPTION OF AN EXEMPLARY EMBODIMENT

Figure 1:
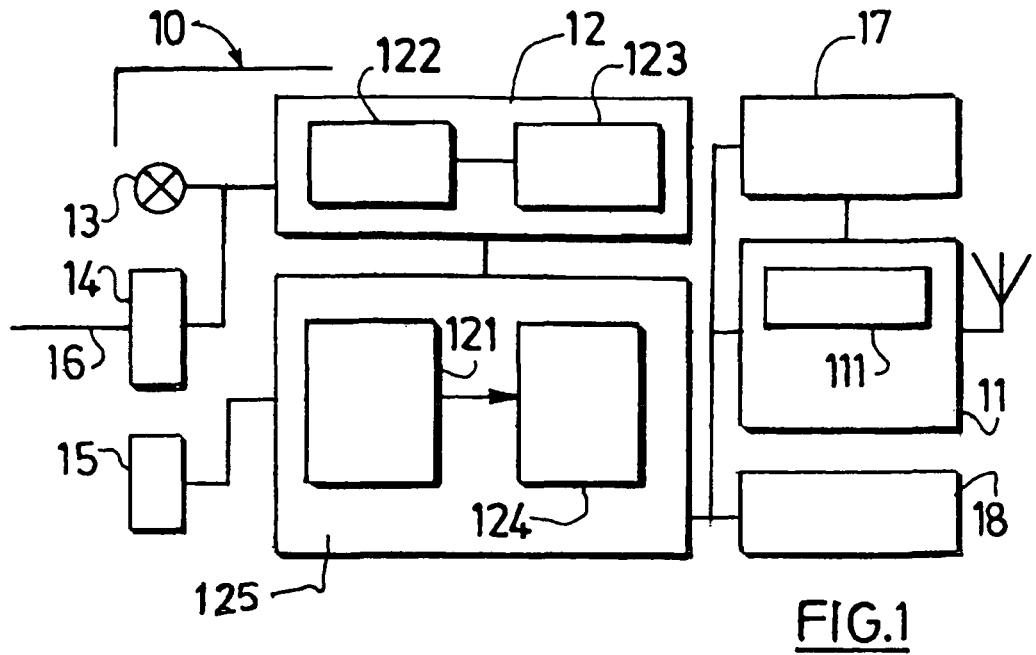
FIG. 1 represents a functional block diagram of a first embodiment of the transceiver according to the invention.

With reference to FIG. 1, a transceiver 10 comprises a radio module 11, with at least one transmit-receive module 111 linked to a microprocessor 12 integrating ordinary functions, not represented, of supervision and also, for example, of remote control, and at least one module 123 for learning the frequency bands or exchange protocols used by the radio module 11, a user interface composed of a keypad 15 comprising buttons for activating the functions of the microprocessor or for entering data, optionally micro-contacts making it possible to display codes, of LED indicator lights or of viewing screen 13 and, when the transceiver is integrated with an external electronic system, for example an automobile cabin computer, an interface 14 linked to a communication bus 16.

A memory 18 that can serve as buffer memory but also for storage of data is linked to the microprocessor and to zone identification means 125 comprising means of location 121 and/or means of processing 124 of radio signals.

The microprocessor 12 furthermore comprises means of checking 122 the frequency band used by the radio module 11 and linked to the memory 18.

The assembly finally comprises an electrical supply module 17 for supplying the microprocessor and the radio module.

The memory 18 contains in particular data regarding frequency bands permitted in determined geographical zones. These data are sorted therein by codes C of zones or countries. The user can enter the said code C by virtue of the keypad 15 linked to the identification means 125, which provide the said code to the checking means 122. But the code C can also originate from an external system through the channel of the communication bus 16 and of the interface 14 or through the radio module 11.

Figure 2:
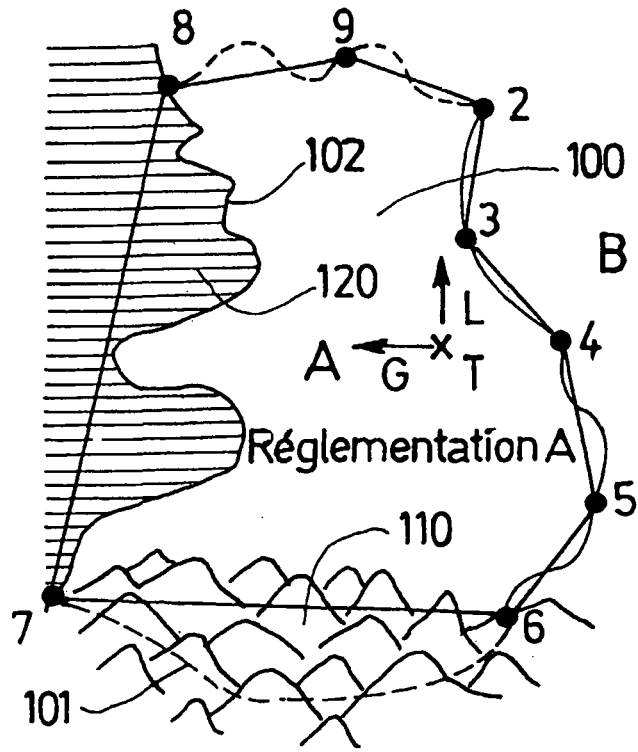
FIG. 2 is a diagram representing a geographical zone boundary with its description by rectilinear segments.

According to a preferred embodiment, with reference to FIG. 2, the memory 18 also comprises data describing boundaries 1 of determined geographical zones 100.

These description data consist of sets of geographical coordinates, for example the longitudes G and latitudes L, of points 2, 3, . . . , 9 previously chosen on the boundary 1 of the geographical zones 100 in which the transceivers can be used, and for each of which the regulation A is unique, but different from that B of the neighbouring zones. To each set of coordinates there corresponds a different geographical zone code.

The points are chosen sufficiently close together so that the rectilinear segments joining two successive points do not deviate too much from the boundary 1 to the point of allowing illicit use of the transmitter which would not be detectable. If the boundary 1 is situated in a mountainous region 110 such as its part 101 or in a maritime region 120 such as its part 102, the successive points 6 and 7 or 7 and 8 may be very distant to the extent that the use of the transceiver in the regions 110 or 120 is not possible.

In this embodiment, the means of location 121 calculate the country code C on the basis of two kinds of data:

1—geographical coordinates of the transceiver, longitude and latitude, collected on the basis of an external navigation system or of a GPS near the transceiver by the channel of the communication bus 16 and of the interface 14 or input directly by the user of the transceiver by virtue of the buttons of the keypad 15, and 2—data describing boundaries 1 of the determined geographical zones 100 included in the memory 18.

These data are then prerecorded in the memory 18 here envisaged as non-volatile.

It is also possible to envisage that the means of location 121 comprise a GPS or other global positioning system.

According to a beneficial embodiment including a downloading function included in the means of processing 124, the radio module 11 and the identification means 125 through its means of processing 124 of the radio signals make it possible to download the said data, that is to say the permitted frequency bands and the specified protocols of the zone approached B, in the memory 18, at the moment of passing in proximity to the zone delimitation posts (not represented). These posts may for example be remote-toll posts.

Thus, whatever embodiment is chosen, the checking means 122 can thus extract from the memory 18, for a given code C, the frequency bands permitted by the regulation in zone A or B or in the country of use, as well as the protocols specified in the said zone.

The manner of operation of the transceiver will now be described in its preferred embodiment.

Figure 3:
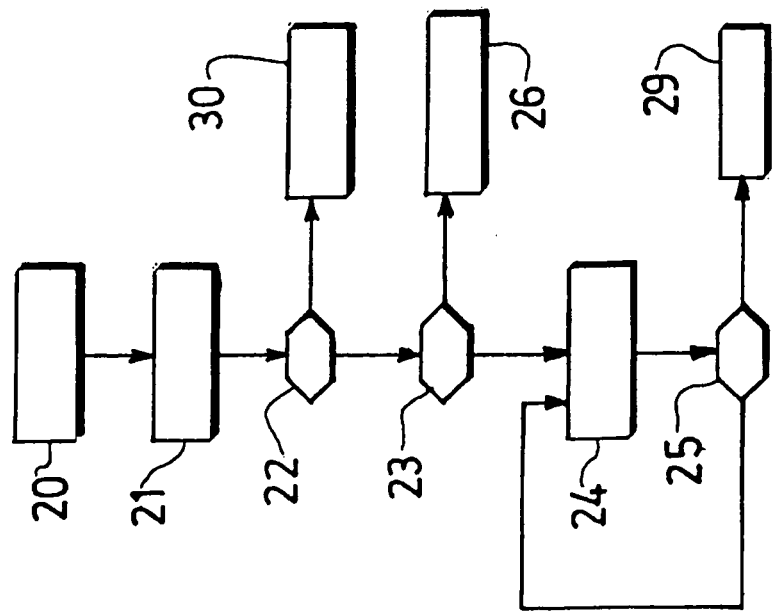
FIG. 3 is a functional flowchart of the general operation of the transceiver according to the invention.

When the user turns on his transceiver, with reference to FIG. 3, he instigates a step 20 of activation of the radio module 11, by the microprocessor 12, from a communication channel corresponding to the last frequency band used.

In a step 21 of geographical location of the transceiver, the means of location 121 collect either the coordinates, longitude G and latitude L, present on the bus 16 and the interface 14, of the location T of the transceiver, or a zone or country code C displayed by virtue of the buttons or micro-contacts of the keypad 15. Then:

if the means of location 121 have the code C, the code is transmitted to the checking means 122 for a checking processing explained further on, and if the means of location 121 have the coordinates L and G of the location T of the transceiver, the code C is calculated on the basis of the data describing the boundaries 1 of the geographical zones 100 or countries held in the memory 18.

The person skilled in the art is aware of algorithms making it possible to situate a point T in relation to a polygon defined by its vertices such as the points 2, 3, . . . , 9. Such an algorithm makes it possible to identify in the memory 18 which set of coordinates of these points describes a polygon containing T, therefore in which zone 100, that is to say at which country or zone code C, the point T is situated. Once it has been determined, the code C is transmitted to the checking means 122 for the checking processing.

In a step 22, the radio module 11 tests whether the communication channel is established.

If it is established, the checking means 122 compare, in a step 23, the frequency band and/or the exchange protocol used with the whole suite of permitted frequency bands and/or the exchange protocols which are stored in the memory 18 alongside the code C previously calculated or collected. If the frequency band and/or the protocol used does not appear in this suite, the checking means 122 trigger a step 26 of displaying a "prohibited band" and/or "incorrect protocol" message on the screen or activates the indicator light 13. Otherwise step 24 of transmission can be performed so long as the activation of the transceiver is effective during step 25, after which the transceiver passes to a waiting step 29.

Figure 4:
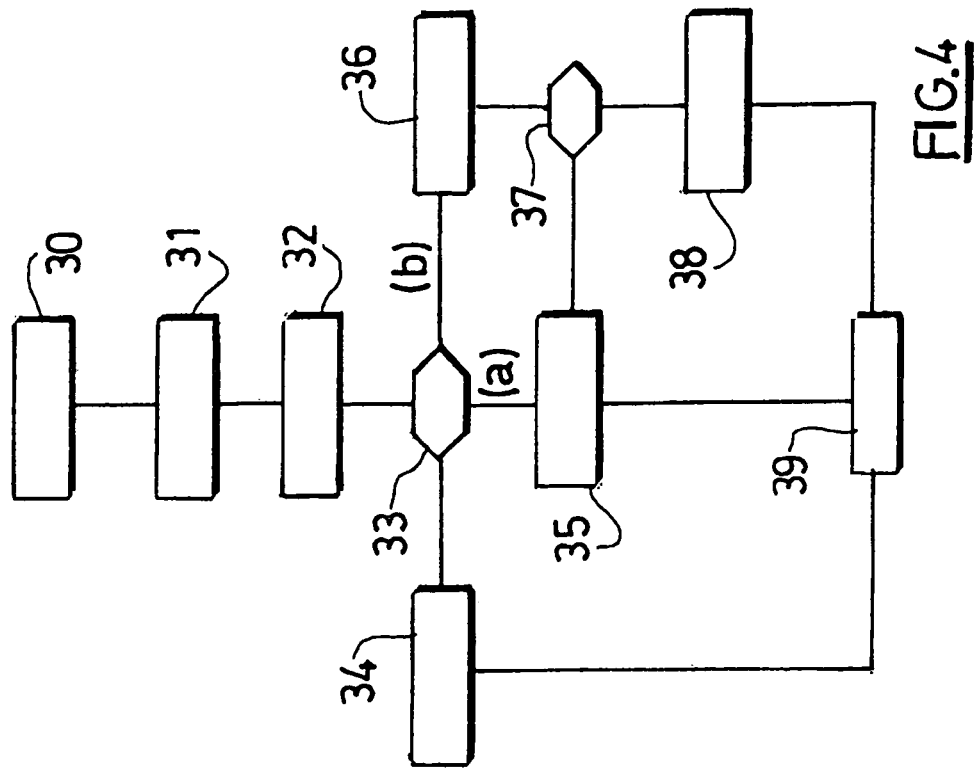
FIG. 4 is a functional flowchart of the operation in learning mode of the transceiver according to the invention.

If, with reference to FIG. 4, the communication channel is not established, the microprocessor 12 instigates step 30 to initialize the phase of learning of the transceiver and possibly of a remotely controlled appliance, not represented.

Prior to this learning phase, during a step 31, the checking means 122 extract from the memory 18 the data of permitted frequency bands and/or the specification data of the protocol in force corresponding to the code C and transmit these data to the learning module 123, which, during a step 32, effects the learning of the transceiver and possibly of the remotely controlled appliance.

At the end of successful learning, detected during a step 33 performed by the microprocessor 12, the learning is terminated during a step 34, and the remote control device is placed in a waiting mode during a step 39.

If, in step 33, the learning has failed, either, in a version (a), the microprocessor indicates the failure by a step 35 of signalling, or, in a version (b), it attempts, by a step 36 of selection of other non-permitted bands, and a step 37 of possible learning test, another learning, as provisional user help or assistance, for example for a limited number of usages, and optionally searches for another protocol corresponding to the new attempted frequency band. Whatever the result, it is signalled, by a step 35 in the event of failure and by a step 38 in the event of success, with the wording, however, "prohibited band" or "incorrect protocol".

In the beneficial embodiment including a downloading function, the zone identification operations are the following:

When the transceiver 10 passes in proximity to a post for delimiting the zones A and B, the post transmits radio signalling signals on a permitted frequency of zone A which is exited.

The receiver of the transmit-receive module 111 receives these signals, demodulates them and digitizes them, transmits them to the means of processing 124 of the identification means 125.

The means of processing 124 translate the digital signals either into data to be downloaded to the memory 18, or into data utilizable by the identification means 125, in which case they transmit them to them.

The means of processing 124 of the radio signals can thus, if the transmitted data are data to be downloaded, download the said data directly into the memory 18, in particular the permitted frequency bands and the specified protocols of the zone approached B, then in this case trigger at the checking means 122 a check of the permitted frequency bands and of specified protocols of the zone approached B, then finally a learning sequence executed by the learning module 123 according to the process explained above. But the downloaded data can also contain update data for geographical data or software for processing the protocols.

If the transmitted data contain a zone code C, the code is transmitted to the identification means 125, which trigger at the checking means 122 a check of the permitted frequency bands and specified protocols of the zone approached B, by extracting the data of permitted frequency bands and protocols specified in the memory 18 on the basis of the code C, then a learning sequence executed by the learning module 123, as previously.

The latter embodiment can include the geographical location or otherwise, the identification of the geographical zone being in a kind of way afforded as assistance by the posts for delimiting zones.

The invention claimed is:

1. A transceiver for coupling to a vehicle, comprising:
a radio module;
a microprocessor configured to determine a country of travel based on received location information, wherein the microprocessor is configured to download new radio frequency band information for the determined country of travel, from a remote source, using radio frequency communications of the transceiver;
wherein the microprocessor is configured to recall the downloaded radio frequency band information from memory in response to the determined country of travel;
wherein the microprocessor is configured to adjust the frequency of the radio module in response to the recalled radio frequency band information;
wherein the microprocessor is configured to compare a current frequency for the radio module to the recalled radio frequency band information and to cause an electronic display in the vehicle to indicate that the current frequency is prohibited for the country of travel.

2. The transmitter of claim 1, wherein the microprocessor is configured to receive the location information from a global position system receiver.

3. The transmitter of claim 1, wherein the microprocessor determines the country of travel by comparing boundary information to the received location information.

4. The transmitter of claim 1, wherein the microprocessor is configured to receive the location information from a user input device in the vehicle.

5. A method for operating a transceiver in a vehicle, comprising:
receiving location information at a microprocessor coupled to the vehicle transceiver;
using the microprocessor to determine a country of travel based on the received location information;
using radio frequency communications of the vehicle transceiver, downloading new radio frequency band information for the determined country of travel from a remote source;
recalling the new radio frequency band information from memory in response to the determined country of travel;
adjusting the frequency of the radio module in response to the downloaded and recalled new radio frequency band information; and
comparing a current frequency for the radio module to the new recalled radio frequency band information; and causing an electronic display in the vehicle to indicate that the current frequency is prohibited for the country of travel.

6. The method of claim 5, wherein receiving location information at the microprocessor comprises receiving coordinates from a global positioning system receiver.

7. The method of claim 5, wherein receiving location information at the microprocessor comprises receiving location information from a user input device in the vehicle.

8. The method of claim 5, wherein determining the country of travel comprises comparing boundary information to the received location information.

* * * * *